June 30, 1970  R. E. CUSHERA ETAL  3,518,373
DISPLAY CONTRAST ENHANCEMENT APPARATUS FOR USE WITH
A CATHODE RAY TUBE
Filed Sept. 24, 1968
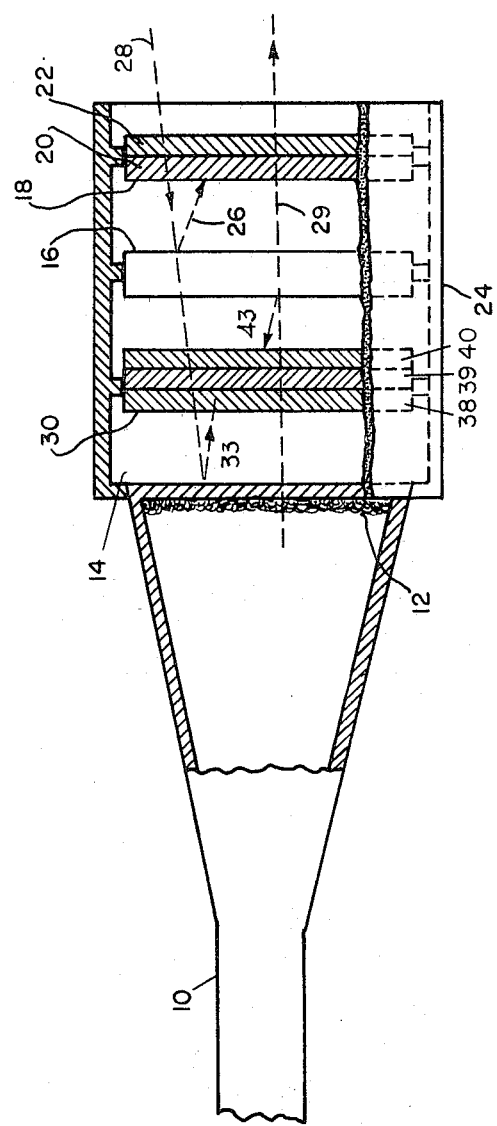
INVENTOR.
ROSARIO E. CUSHERA
BY  JOSEPH L. HALLETT
AGENT

United States Patent Office 3,518,373
Patented June 30, 1970

3,518,373
DISPLAY CONTRAST ENHANCEMENT APPARATUS FOR USE WITH A CATHODE RAY TUBE
Rosario E. Cushera, Waltham, and Joseph L. Hallett, Sudbury, Mass., assignors to Sylvania Electric Products Inc., a corporation of Delaware
Filed Sept. 24, 1968, Ser. No. 761,982
Int. Cl. H04n 5/72
U.S. Cl. 178—7.85      4 Claims

ABSTRACT OF THE DISCLOSURE

A display contrast enhancement apparatus employing in light transmitting arrangement a cathode ray tube having a narrow band luminous substance disposed on the face thereof, a narrow band interference filter with a passband equal to and centered about the frequency spectrum of the luminous substance to reflect ambient and emitted light not within the passband and a set of absorption filters to absorb not only the reflected light not within the passband but also light within the passband reflected from the face of the tube.

BACKGROUND OF THE INVENTION

This invention relates to display systems and more particularly to apparatus for enhancing the contrast characteristics of a display tube.

Display tubes, for example, cathode ray tubes (CRT), exhibit poor contrast because of a high value of diffuse reflectivity associated with powder phosphor screens used on the CRT. Ambient light incident on the tube transfers energy to the screen producing an undesirable background brightness which results in poor contrast.

Conventional contrast enhancement by spectral filtering includes the use of an absorption filter placed over the face of the tube. This technique of spectral filtering is limited in effectiveness because absorption filters exhibit a gradual "roll-off" of their transmission versus wavelength characteristics allowing a large percentage of the visible ambient light to penetrate the filter, be reflected by the phosphor and re-emerge as unwanted background luminance.

In a second known technique for contrast enhancement, a multilayer interference filter is employed in lieu of an absorption filter over the face of the display tube. Although an interference filter exhibits a sharper "roll-off" in its transmission versus wavelength characteristics, it rejects incident radiation outside its passband by means of reflection. This reflection results in a visual appearance of a highly reflecting specular surface which degrades the contrast of a display.

SUMMARY OF THE INVENTION

In accordance with the present invention, a display system having enhanced contrast characteristics employs along a common optical axis a display means, typically a cathode ray tube, having a narrow band luminous substance disposed on its face, a narrow band interference filter having a bandwidth substantially equal to and centered about the frequency spectrum of the narrow band luminous substance and an absorption filter placed on each side of the narrow band interference filter. The incident ambient light passes through the first absorption filter to the interference filter which in turn reflects all the ambient light not within its passband. The reflected light from the narrow band filter is absorbed by the first absorption filter and only the small amount of ambient light in the bandwidth of the filter reaches the face of the tube.

The second absorption filter, positioned on the display side of the interference filter, suppresses two other unwanted light components, namely emitted light on the spectral edge of the passband of the interference filter which would otherwise be reflected back to the display tube surface and ambient light within the interference filter passband which is reflected from the face of the display tube. A dark background results from the above combination which considerably enhances the contrast of the display.

DESCRIPTION OF THE DRAWINGS

The construction and operation of the invention will be more fully understood from the following detailed description taken in conjunction with the accompanying drawing in which the only figure is pictorial diagram illustrating a preferred embodiment of the invention.

DETAILED DESCRIPTION OF THE INVENTION

A contrast enhancement apparatus according to the invention is illustrated in the diagram. A display device 10, typically a cathode ray tube, has a narrow band luminous substance 12, such as a phosphor having a narrow band emission frequency, disposed on the inner surface of the face 14 of the display device 10. An interference filter 16 having a bandwidth substantially equal to and centered about the spectrum of the narrow band luminous substance 12 is positioned along a common optical path in a light transmitting arrangement with the display device 10. A first absorption filter 18, which includes a quarter wave retardation plate 20 and a polarizer 22, is positioned along the common optical path with the interference filter 16 and the display device 10. A second absorption filter 30, which is formed by two quarter wave retardation plates 38 and 40 and a linear polarizer 39, is positioned between the display device 10 and the interference filter 16. An opaque shield 24 is placed around the above elements of the optical system to limit the entrance of the ambient light to the open end of the shield.

In operation, all ambient light entering the open end of the shield 24 passes through the absorption filter 18, where the light is polarized. The polarized ambient light 26 that is outside the passband of the interference filter 16 is reflected back toward the absorption filter 18. The ambient light 26 transmitted by the absorption filter 18 becomes oppositely polarized upon reflection from the interference filter 16. The absorption filter 18 then completely absorbs the reflected ambient light 26.

The incident ambient light 28 which is passed by the interference filter 16 is directed through the second absorption filter 30 to the outer surface of the face 14 of the display tube 10. There is a specular reflection of a light component 33 from the face 14 back toward the absorption filter 30. This light component 33 is absorbed by the combined action of the quarter wave retardation plate 38 and the linear polarizer 39. Therefore, only a small amount of the original incident ambient light 28 reaches the luminous substance 12.

The emitted light 29 from the luminous substance 12 passes through the face 14 of the display tube 10, the series combination of second absorption filter 30, the interference filter 16 and the first absorption filter 18 to the viewer. By having the absorption filters 30 and 18 optically aligned (both linear polarizers 22 and 39 being parallel), the emitted light 29 that is within the passband of the interference filter 16 is attenuated, approximately 3 db, the equivalent of one polarizing filter. A small component 43 of the emitted light 29 is on the fringes of the interference filter passband and is reflected off the surface of the filter 16 back towards the display tube. The light component 43 becomes oppositely polarized upon reflection and is absorbed in the quarter wave retardation plate 40 and linear polarizer 39 of the absorption filter 30. The absorption filter 30 suppresses the halation effect (an unwanted halo of light around the emitted beam) which would otherwise be present from spectral frequencies partially transmitted and partially reflected.

A display contrast enhancement system according to the present invention was constructed using a cathode ray tube with a rare earth phosphor, specifically indium orthoborate activated by terbium, deposited on its inner face. The entire emission band of this phosphor is less than 25 millimicrons centered at about 547 millimicrons. The interference filter employed has a center frequency centered about 547 millimicrons and has a bandwidth covering about 22 millimicrons.

While there has been shown and described what is considered a preferred embodiment of the present invention, it will be obvious to those skilled in the art that various modifications and changes may be made therein without departing from the invention as defined by the appended claims.

What is claimed is:
1. Display apparatus comprising:
    display means having a narrow band luminous substance associated therewith, said narrow band substance being capable of emitting light;
    a narrow band filter disposed along a common optical axis in light transmitting arrangement with said display means, said narrow band filter having a passband substantially equal to and centered about the frequency spectrum of the narrow band luminous substance of said display means, said narrow band filter being operative to reflect ambient light not within its bandwidth;
    a first absorption filter positioned in light transmitting arrangement with said narrow band filter, said absorption filter being operative to absorb the reflected ambient light from said narrow band filter whereby ambient light outside the bandwidth of said narrow band filter is prevented from impinging on said display means; and
    a second absorption filter positioned between said display means and said narrow band filter in light transmitting arrangement, said second absorption filter being operative to absorb the emitted light from said narrow band luminous substance that is reflected from said narrow band filter and to absorb ambient light within the passband of said narrow band filter that is reflected from said display means.

2. Display apparatus according to claim 1 wherein said display means is a cathode ray tube and wherein said narrow band luminous substance is indium orthoborate activated by terbium, said narrow band luminous substance being disposed on the inner surface of the face of said cathode ray tube.

3. Display apparatus according to claim 1 wherein said first absorption filter includes a first polarizer operative to polarize the ambient light in one direction and a first quarter wave retardation plate operative to shift the direction of polarization of the ambient light reflected from said narrow band filter whereby said reflected ambient light is absorbed in said polarizer.

4. Display apparatus according to claim 3 wherein said second absorption filter includes a second polarizer being operative to polarize the ambient light in one direction; a second quarter wave retardation plate positioned between said second polarizer and said narrow band filter, said second quarter wave retardation plate being operative to change the direction of light polarization of the emitted light from said luminous substance which has passed through said second polarizer and is reflected from said narrow band filter whereby the reflected light from said narrow band filter is absorbed; and a third quarter wave retardation plate positioned between display means and said second polarizer, said third quarter wave retardation plate being operative to change the direction of polarization of the ambient light that has passed through said second polarizer and is reflected from said display means whereby the ambient light reflected from said display means is absorbed.

References Cited
UNITED STATES PATENTS

| | | | |
|---|---|---|---|
| 2,874,377 | 2/1959 | Lawlor | 178—7.85 |
| 2,918,670 | 12/1959 | Cusano | 178—7.85 |
| 3,205,775 | 9/1965 | Marks | 350—276 |
| 3,410,626 | 11/1968 | Magrath | 350—316 |

RICHARD MURRAY, Primary Examiner

J. A. ORSINO, Jr., Assistant Examiner

U.S. Cl. X.R.

252—301.4; 313—92, 111, 112; 350—166, 276, 316